Oct. 8, 1957
L. SAIVES
2,808,729
RATCHET DEVICES FOR INCORPORATION IN
TRANSMISSION SYSTEMS FOR VEHICLES
Filed May 8, 1953
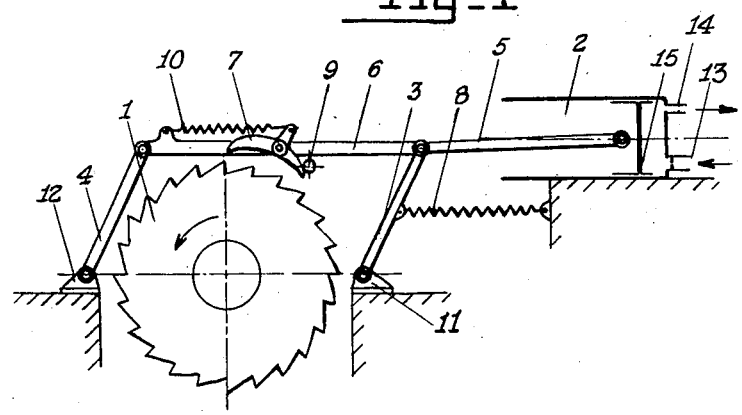
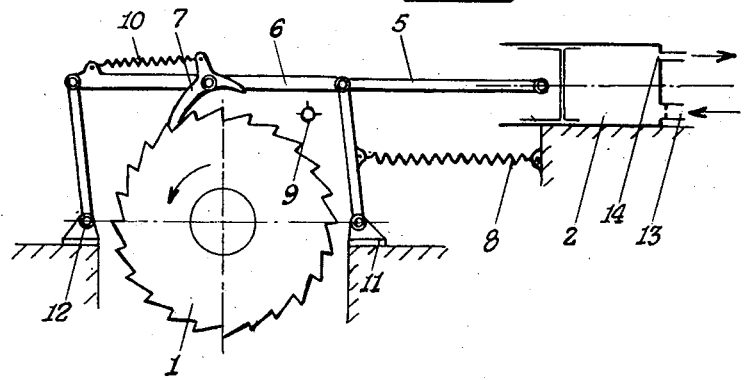

United States Patent Office 2,808,729
Patented Oct. 8, 1957

2,808,729
RATCHET DEVICES FOR INCORPORATION IN TRANSMISSION SYSTEMS FOR VEHICLES

Léon Saives, Billancourt, France, assignor to Regie Nationale des Usines Renault, Billancourt, France Application May 8, 1953, Serial No. 353,757

Claims priority, application France June 30, 1952

2 Claims. (Cl. 74—128)

In vehicles equipped with a change-speed gear or reverse gear comprising direct-drive dog-clutches carried respectively by the propeller shaft of the engine or driving turbine and by the driven shaft, it is known that, as a result of the relative position of the dog-clutches, difficulties may arise in operating the change-speed gear of the reverse gear, particularly when this operation has to be carried out at a standstill, with the engine or turbine stopped or disconnected. It is usual in this case, after the gear level has been placed in the required position, to use the turbine or the engine to turn the dog-clutch of the driving shaft and to complete the engagement of the clutch when this could not be done immediately.

Nevertheless this method has certain disadvantages, arising particularly from the fact that it is difficult to obtain a rotation of the driving shaft which is sufficiently slow to avoid any shock on engagement of the dog-clutches.

The object of the invention is to provide an improvement which can be applied in particular to road or rail vehicles with mechanical or hydraulic transmission and which is particularly suitable for turbine driven vehicles.

The invention consists in providing members on the driving shaft, which are capable of giving it a low and restricted rotation independent of the engine or driving turbine or of the usual starting members.

In a preferred embodiment, an air or oil cylinder actuates, via a system of articulated rods, a pawl which cooperates with a ratchet wheel fixed to the propeller shaft.

A specific embodiment of the invention will now be described, by way of example, with reference to the accompanying drawings in which:

Figure 1 is a diagram of a device according to the invention in the position of rest, and Figure 2 is a diagram of the device in the operating position.

Referring to the drawings, the device comprises:

A ratchet wheel 1 fixed to the output shaft of the engine or of the driving turbine, an actuating cylinder 2 fed with air or oil, a system of articulated rods arranged in a parallelogram comprising two rods 3 and 4, a connecting rod 5 and a rod 6 driving a pawl 7.

The operation is as follows:

In the inoperative position (Figure 1), the entire device is urged towards the right by the spring 8, the driving piston 15 is at the head of its cylinder 2, the pawl 7 is kept disengaged from the teeth of the ratchet wheel 1 by the stop 9. When air or oil is delivered to the cylinder 2 (Figure 2) through a calibrated nozzle, the piston pushes the entire system towards the left at a speed determined by the bore of the nozzle 13. The pawl 7 leaves the stop 9 and, pulled by the spring, its tip engages in a notch in the wheel 1, the pawl describes an arc about the centre of the wheel, by means of the rods 3 and 4 which pivot about fixed points 11 and 12, the axes of which are situated on a line passing through the centre of the wheel, and drives said wheel. When the cylinder is emptied via the orifice 14, fitted with a valve, the spring 8 returns the whole system towards the right, the pawl 7 comes to rest against the stop 9 and is disengaged from the notches of the wheel.

In addition, the device makes it possible to turn the engine or the turbine when stopped if necessary.

If the transmission includes a clutch, the ratchet wheel is mounted on the shaft between the clutch and the member or members governed by the direct-drive dog-clutches.

I claim:

1. A device for imparting annular movement to a rotatable shaft which comprises, in combination, a ratchet wheel rigidly connected to said shaft, pawl means adapted to be selectively moved into engagement with said ratchet wheel for effecting rotation thereof through a predetermined angle, said pawl means being pivotally carried by a bar with spring means for normally urging said pawl means into engagement with said ratchet, said bar being connected to two parallel arms pivotally mounted on fixed pivots to define a parallelogram, a piston rod connected to effect reciprocating movement of said bar, said piston rod being connected to a piston slidably mounted in a cylinder having means for the selective admission of a fluid to control the movement of said piston rod and thereby to control the movements of said bar carrying the pawl means, said pawl means being moved into engagement with said ratchet and rotating said ratchet upon forward movement of said piston in response to fluid pressure, and means for moving the pawl means out of engagement with the ratchet upon release of fluid pressure in said cylinder, and means acting upon said piston in a direction opposite to the direction of application of fluid pressure.

2. A device for imparting annular movement to a rotatable shaft which comprises, in combination, a ratchet wheel rigidly connected to said shaft, pawl means adapted to be selectively moved into engagement with said ratchet wheel for effecting rotation thereof through a predetermined angle, said pawl means being pivotally carried by a bar with means for normally urging said pawl means into engagement with said ratchet, said bar being connected to two parallel arms pivotally mounted on fixed pivots to define a parallelogram, a piston rod connected to effect reciprocating movement of said bar, said piston rod being connected to a piston slidably mounted in a cylinder having means for the selective admission of a fluid to control the movements of said piston rod and thereby to control the movements of said bar carrying the pawl means, said pawl means being moved into engagement with said ratchet and rotating said ratchet upon movement of said piston in response to fluid pressure, and means for moving the pawl means out of engagement with the ratchet after release of fluid pressure in said cylinder.

References Cited in the file of this patent

UNITED STATES PATENTS

| | | |
|---|---|---|
| 381,279 | Pruden | Apr. 17, 1888 |
| 1,010,835 | Whalton | Dec. 5, 1911 |
| 1,220,362 | Reis et al. | Mar. 27, 1917 |
| 2,563,584 | Crookston | Aug. 7, 1951 |
| 2,618,982 | Mead | Nov. 25, 1952 |